United States Patent [19]
Krawczak et al.

[11] Patent Number: 5,796,744
[45] Date of Patent: Aug. 18, 1998

[54] MULTI-NODE INTERCONNECT TOPOLOGY WITH NODES CONTAINING SCI LINK CONTROLLERS AND GIGABIT TRANSCEIVERS

[75] Inventors: John Anthony Krawczak, Minnetonka; Steven Allen Murphy, Apple Valley, both of Minn.

[73] Assignee: Lockheed Martin Corporation, Bethesda, Md.

[21] Appl. No.: 928,997

[22] Filed: Sep. 12, 1997

[51] Int. Cl.$^6$ .................................................. H04J 3/06
[52] U.S. Cl. .................... 370/503; 375/356; 395/200.52; 395/200.78
[58] Field of Search ........................... 370/351, 352, 370/353, 389, 400, 406, 452, 453, 454, 455, 503, 507, 509, 258, 257, 254, 255; 375/356, 357; 395/800.11, 800.12, 800.19, 312, 200.5, 200.51, 200.52, 200.66, 200.67, 200.78, 200.81; 364/940.3, 940.4, 940.5, 940.61, 940.63, 940.68, 299.3, 299.5, 230, 231.9

[56] References Cited

PUBLICATIONS

"Low Cost Gigabit Rate Transmit/Receive Chip Set with TTL I/O's", Hewlett–Packard Preliminary Technical Data, Aug. 1996, Rev. 1.1.

*Primary Examiner*—Huy D. Vu
*Attorney, Agent, or Firm*—Glenn W. Bowen

[57] ABSTRACT

A multi-node Scalable Coherent Interface ring for the transmission of packets between nodes, each of which contains an SCI link controller to which a B-link controller that contains a timer is coupled and a gigabit transceiver to which a G-link controller that contains a timer is coupled, is provided. The SCI link controller, the B-link controller and the G-link controller are utilized to allow the SCI link controller and the transceivers to be initialized and synchronized in a manner such that these devices may be utilized in a multi-node SCI packet network.

1 Claim, 4 Drawing Sheets

MULTI-NODE INTERCONNECT TOPOLOGY WITH NODES CONTAINING SCI LINK CONTROLLERS AND GIGABIT TRANSCEIVERS

FIELD OF THE INVENTION

The field of the invention is multi-node networks for transmitting SCI packets from nodes, each of which contains an SCI link controller and a gigabit transceiver.

BACKGROUND OF THE INVENTION

The Scalable Coherent Interface (SCI) IEEE standard 1596–1992 defines fast, point-to-point transmission links which provide services similar to those commonly offered in a computer bus architecture. In a multi-processor environment, however, the scalability of a traditional bus is limited by problems associated with tapped transmission lines, reflections and capacitive loading which do not provide significant problems to the fast, point-to-point unidirectional links of the SCI standard.

The packet transfer protocol is used by SCI to implement various transactions on the high-speed links. This arrangement scales very well from a small number of nodes to a large number of nodes, although the latency, or the time required to send information from one node to another, increases linearly with the number of nodes if they are connected in a ring.

Dolphin Interconnect Solutions AS, Olaf Helsets, Vei, No. 6, P.O. Box 52 Bogerud, N-0621, Oslo, Norway, provides a link controller under the name LC-1 which implements the IEEE SCI standard. The LC-1 controller has a back-end interface called a B-link by Dolphin Interconnect Solutions. The B-link is a high-performance, multi-master bus with the capability of transferring several hundred megabytes of data per second. The data is transferred on the bidirectional 64-bit-wide bus. The B-link is packet-based and will transparently transfer all SCI-defined packets. There is a separate clock to isolate the B-link from the remainder of the SCI controller. The LC-1 controller is designed so that the B-link may be used as a switch element when a number of these LC-1 controllers are connected together.

In order to achieve long distance high-speed packet transmission in the gigabit range, an actual gigabit rate transmit/receive chip set or transceiver must be employed. One such transceiver is a device sold by Hewlett Packard which has a transmitter designated as a HDMP-1022 Transmitter and a receiver designated as HDMP-1024 Receiver. The gigabit rate HDMP-1022 transmitter and HDMP-1024 receiver chip set has been described in detail in a 40-page Preliminary Technical Data brochure (Rev. 1.1) dated August 1996 that was distributed by Hewlett Packard. This brochure shows how the HDMP-1022 transmitter, the HDMP-1024 receiver, a gigabit or "G-LINK" controller, (which operates on state machine principles), and timing circuitry on the chip set may be utilized to form gigabit transmit and receive G-LINKS. This transmitter and receiver are capable of functioning for gigabit rate transmissions in combination with the link controller where the transmitter receives output control words, or O-words, from the SCI link controller and the receiver supplies input control, or I-words, to the SCI link controller. This combination is currently limited to a full duplex configuration, as shown in the prior art drawing of FIG. 1, and it is not usable in a multi-node ring.

FIG. 1 shows two utilization devices 10 and 12 which are also labeled device A and device B, respectively, which are coupled to transmit data between them through the combination of an SCI link controller, such as the LC-1, and a gigabit transceiver, such as the Hewlett Packard transceiver. The utilization devices 10 and 12 are respectively coupled to the B-link controllers 14, 16, which are shown in separate elements in the Figure, but might be constructed as part of the SCI link controller. The SCI link controllers 18 and 20 are respectively coupled to the B-link controllers 14 and 16 so that the B-link controller provides an interface for packet data transmission between the respective utilization devices and the SCI link controllers.

The transceivers 22 and 24 are coupled to transmit and receive packets of data at gigabit transmission speeds. The transmitter 26 is coupled to supply data to the receiver 28 and the transmitter 30 couples data to the receiver 32. Although the gigabit transmission of SCI packet data between the two devices 10 and 12 can be accomplished by means of this configuration, a multi-node SCI packet distribution ring that is operable at gigabit speeds is not achievable by the prior art which is exemplified by the representative example of FIG. 1.

SUMMARY OF THE INVENTION

A multi-node Scalable Coherent Interface ring for the transmission of packets between nodes, each of which contains an SCI link controller and a gigabit transceiver to which a G-link controller that contains a timer is coupled, is provided. The node also includes a B-link controller which is coupled to the SCI link controller and the transceiver. The B-link controller at each node senses if the SCI link controller at that node is operational and forces it into initialization if it is not. Whenever an SCI link controller is initialized, it sends a fill Frame 0 (FF0) control word to the down stream receivers. Each of the G-link controllers monitors the transmitter and the receiver at its node to determine if they are in synchronization. The G-link controller also monitors the receiver at its node to determine if it has received an FF0 control word from an upstream node. If either the transmitter and receiver are not in synchronization or an FF0 control word has been received, the SCI controller at the node is reset and initialized by a signal from the G-link controller. The FF0 word sent to the downstream receivers upon initialization until the further most receiver in the ring receives an FF0 control word and returns a received message to the originating node. A timer in the G-link controller at the originating node is set to allow further FF0's to be blocked out for a time long enough to allow the FF0's to propagate all the way around the ring and for all of the receivers in the ring to synchronize.

The B-link controller is used to determine if it is in synchronization with the SCI link controller. If it is not, the B-link controller causes the SCI link controller to reset and initialize. The B-link controller then forces the transmitter at its node to send a control word different from FF0 to the downstream receiver. The B-link controller then starts a timer to inhibit further sending of these control words after a return message is sent by the furthermost receiver to the originating node.

BRIEF DESCRIPTION OF THE DRAWINGS

The present invention is described by reference to the drawings in which:

FIG. 3 is implemented in the G-link controller 27;

FIGS. 4, 5 and 6 are implemented in the B-link controller 44. The flow diagrams of FIGS. 3 through 6 are independent state machines that operate in parallel.

TECHNICAL DESCRIPTION OF THE INVENTION

Figure 1:
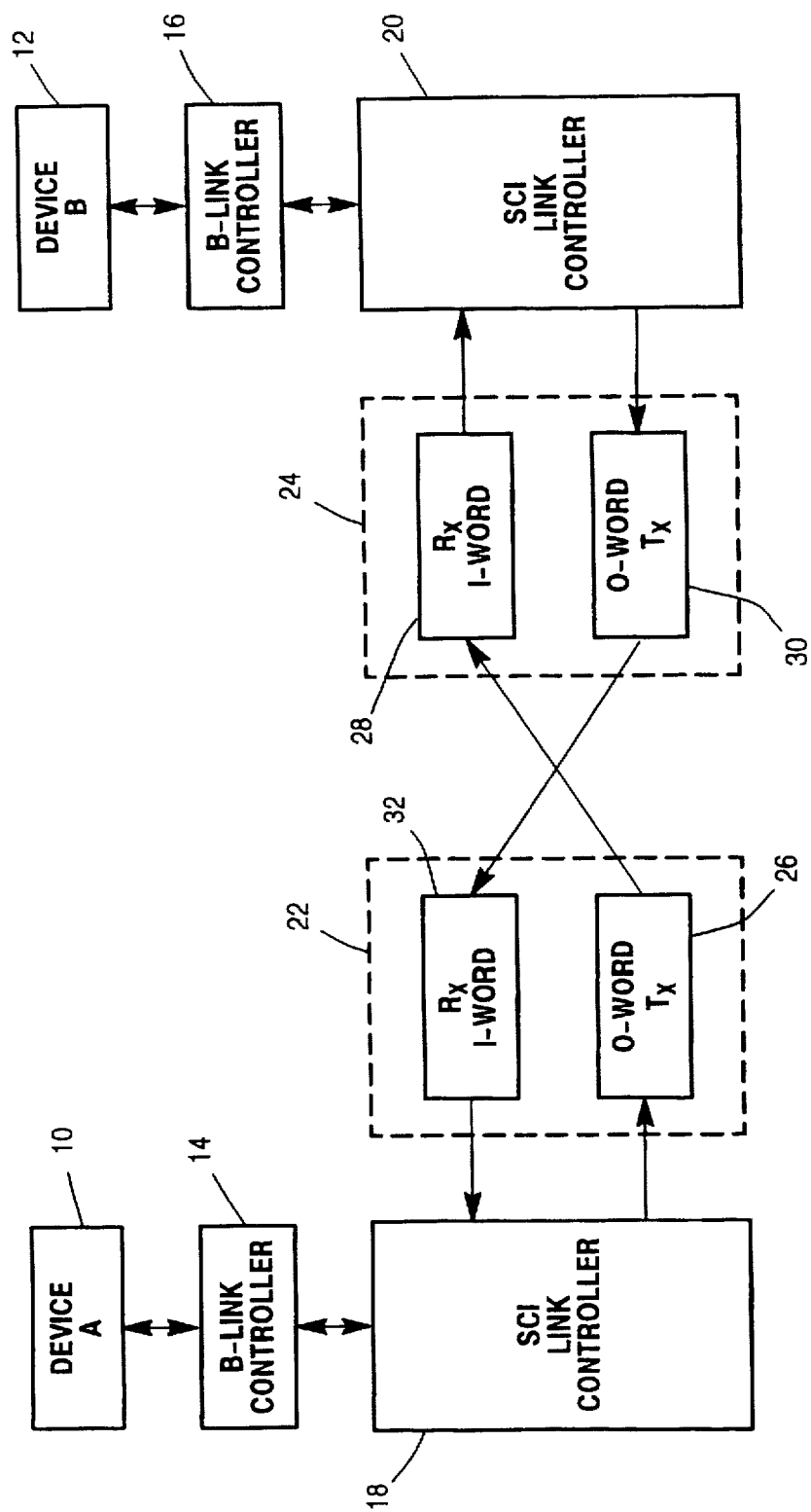
FIG. 1 is a prior art representation of a full duplex implementation of the transmission of packet data that occurs according to the SCI protocol between two SCI link controllers by means of a gigabit transceiver.
Figure 2:
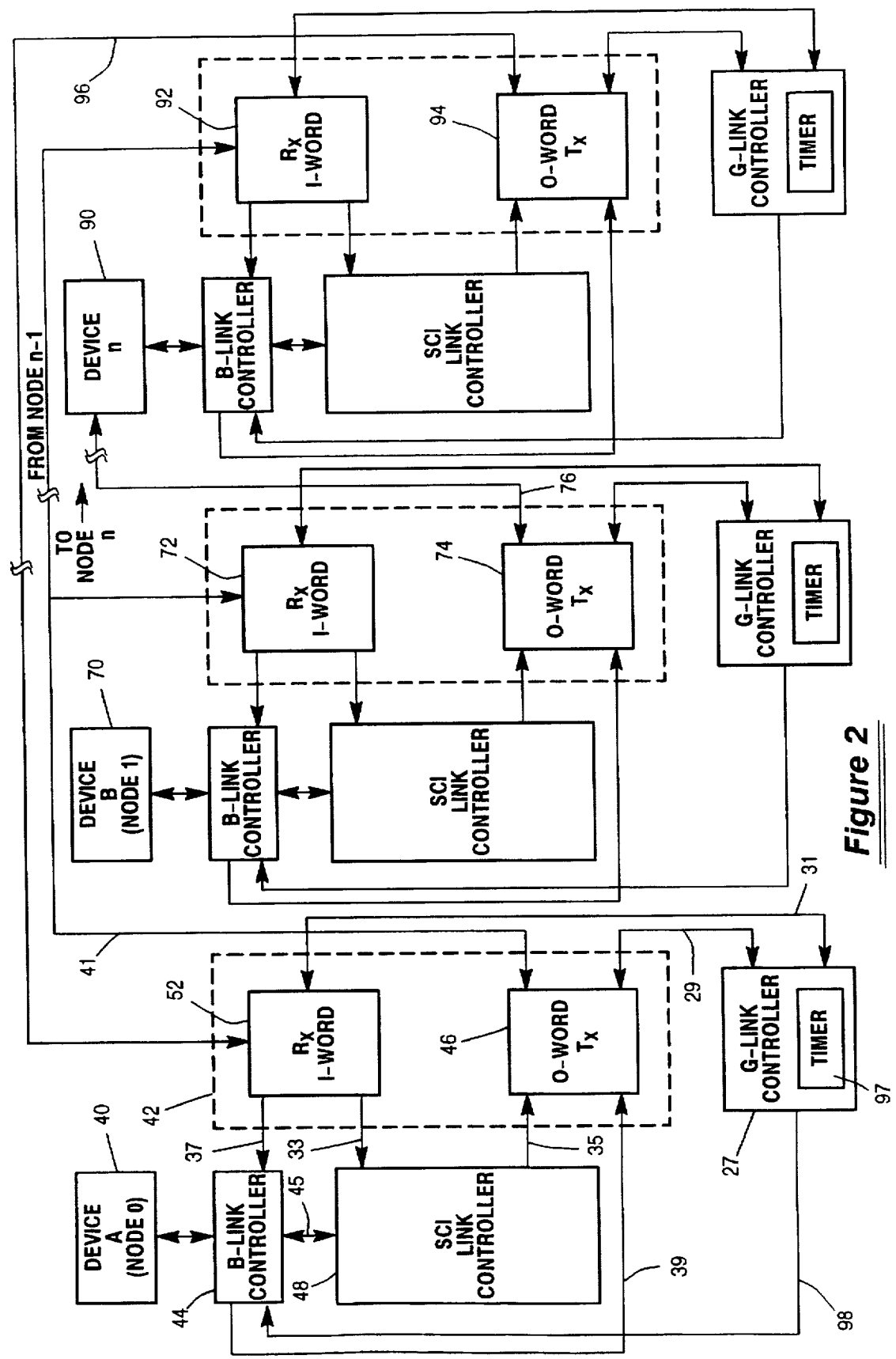
FIG. 2 is a block diagram representation of a multi-node ring that is implemented in accordance with the present invention utilizing SCI link controllers and gigabit transceivers.

The present invention implements a multi-node, SCI packet ring topology which may utilize the same components that were used in the prior art, full-duplex configuration of FIG. 1 with the addition of a G-link controller in each of the nodes, such as the G-link controller 27. The G-link controller 27 is connected to the transmitter 46 via line 29 and also to the receiver 52 via line 31. Lines 29 and 31 consist of several wires some of which go from the G-link controller to the transmitter or receiver respectively and some wires going in the opposite direction. The B-link controller 44 is constructed so that it is able to sense over the B-link bus 45 when the SCI link controller 48 is not operational. If the B-link controller senses the SCI link controller 48 is not operational, it forces it into initialization. The SCI controller 48 and the gigabit transmitter 46 are coupled over the lines 35 so that an O-word can be transmitted from the SCI link controller to the transmitter.

Figure 3:
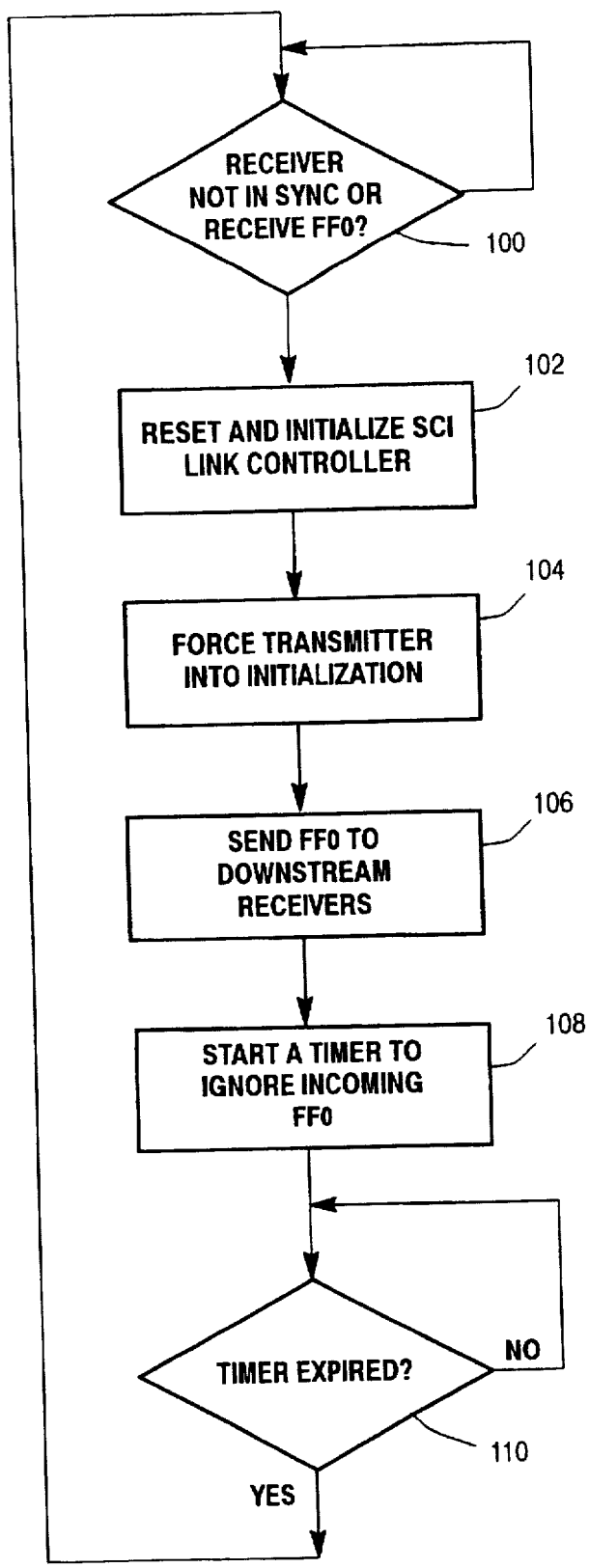
FIG. 3 is a G-link synchronization flow diagram which represents how the G-link receivers are placed into synchronization.

The flow diagram of FIG. 3 will now be described. The receiver 52 has an internal state machine that determines if the receiver is in synchronization with the transmitter 94. Line 31 reports the synchronization state of the receiver 52 to the G-link controller 27. The G-link controller monitors line 31 as shown in step 100 of FIG. 3. If the receiver 52 is out of synchronization or the receiver 52 indicates that it has received a fill frame 0 (FF0) control word from the upstream transmitter 94 via line 96 then the G-link controller 27 sends a signal via line 98 to the B-link controller 44 which resets and initializes the SCI controller 48 as in step 102 of FIG. 3. Then the G-link controller 27 forces the transmitter 46 into initialization via step 104 of FIG. 3 and forces the transmitter to send FF0 to downstream receivers via step 106 of FIG. 3. Subsequently, the other transmitters, such as transmitter 74, relay the FF0 message downstream on lines, such as the lines 76, to the receivers in the ring until receiver 92 is reached. The relay takes place via step 100 of FIG. 3 in each G-link controller. The last transmitter 94 in the chain returns a message to the initiating receiver 52 on the line 96. The G-link controller 27 starts a timer 97 at step 108 of FIG. 3. The timer causes the G-link controller 27 to ignore incoming FF0's. The timer prevents an infinite loop of FF0's from going around and around the ring forever. When the timer expires in step 110 of FIG. 3 the G-link controller 27 goes back to step 100 of FIG. 3 and starts over if necessary. The timer period is set to allow enough time for the FF0's to propagate all the way around the ring and for all of the receivers to synchronize.

Figure 4:
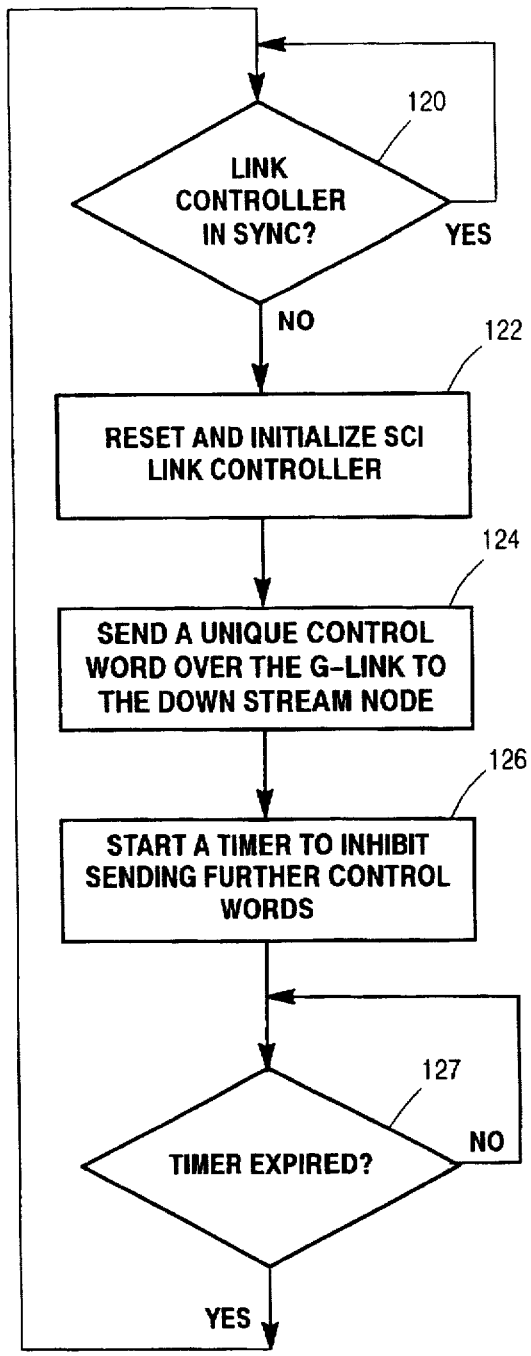
FIG. 4 is a flow diagram which illustrates how the SCI controllers are placed into synchronization when the controller is not in synchronization.

Step 120 of FIG. 4 represents the determination of the B-link controller 44 if the SCI controller is in synchronization. If it is not, it is reset and initialized (step 122) via line 45. The B-link controller 44 then, via step 124 of FIG. 4 forces the transmitter 46 via line 39 to send a unique control word to the downstream receiver 72 via line 41. The unique control word is different from FF0. The B-link controller in step 126 of FIG. 4 then starts a timer to inhibit sending further control words. Subsequently, the other transmitters, such as transmitter 74, relay the additional control word downstream on lines, such as the lines 76, to the receivers in the ring until receiver 92 is reached. The relay takes place via step 112 of FIG. 5 which causes a reset of the SCI controller in step 114 of FIG. 5 which then causes the SCI controller to lose synchronization activating step 120 of FIG. 4. The last transmitter 94 in the chain returns the message to the initiating receiver 52 on the line 96. The timer prevents an infinite loop of unique control words from going around and around the ring forever. The B-link controller 44 waits for the timer to expire in step 127 of FIG. 4 and then goes back to step 120 and starts over if necessary. The timer period is set to allow enough time for the unique control words to propagate all the way around the ring and for all of the SCI controllers to synchronize.

Figure 5:
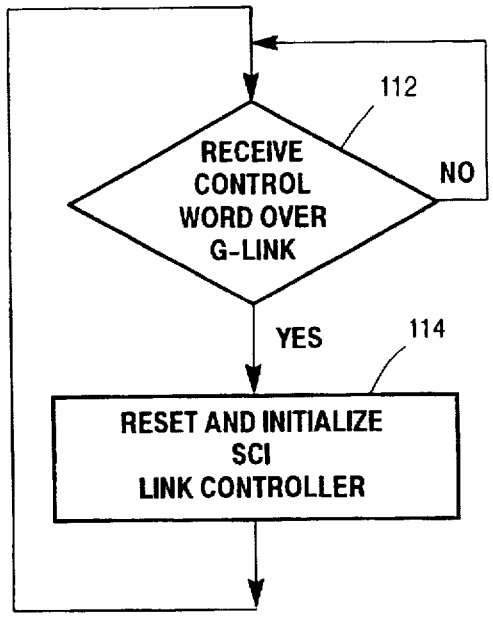
FIG. 5 is a flow diagram of how the SCI link controllers are initialized when a received control word is received over the G-link.

In step 112 of FIG. 5 the B-link controller 44 checks via line 37 to see if the receiver 52 received the unique control word from the upstream transmitter 94. If the unique control word is received then in step 114 of FIG. 5 the SCI controller 48 is reset and initialized via line 45.

Figure 6:
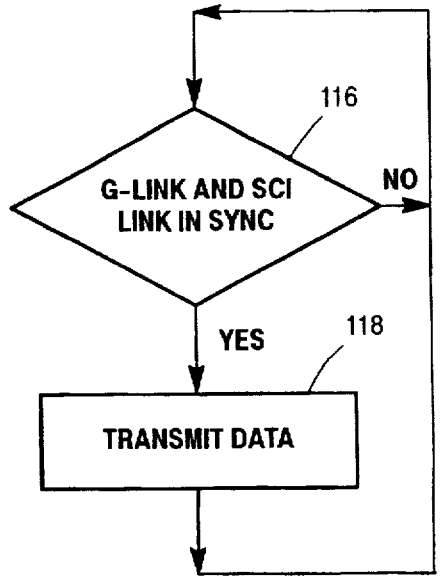
FIG. 6 is a flow diagram that illustrates how packet data is transmitted from one SCI link controller to another when the G-link and the SCI link are in synchronization.

In step 116 of FIG. 6 the B-link controller 44 checks via line 37 to see if the receiver 52 is synchronized and via line 45 to see if the SCI controller 48 is synchronized. If both are synchronized then the B-link controller allows the device A 40 to transmit data in step 118 of FIG. 6.

What is claimed is:

1. A method of forming a plurality of network nodes into a multi-node ring network and of initiating and synchronizing said multi-node network so that it is capable of transmitting data packets between nodes in said multi-node network, wherein each of said nodes comprises a Scalable Coherent Interface (SCI) link controller, a B-link interface controller coupled to the SCI link controller, a transceiver comprising a receiver and a transmitter, both of which are capable of operating up to gigabit data transmission rates and are coupled to the SCI controller and to said B-link controller comprising:

(a) adding a G-link controller to each of said nodes by coupling said G-link controller to said transmitter, said receiver and said B-link controller and performing the following steps (b)–(h) when required, (b) operating the G-link controller and the SCI link controller at each node downstream of said first node to determine if said transmitter and said receiver at said downstream nodes are not in synchronization or if said receiver at said downstream node has received a first control word FF0 which is part of the normal G-link initialization process from the transmitter of the adjacent upstream node so as to initialize said SCI link controller in either event, (c) operating the B-link controller at each node in response to said initialization to transmit a second control word to the next downstream node, (d) setting a first timing period for said G-link controller in said first node that prevents any additional first control words that are received at said first node from affecting said first node for the time it takes for a first control word to propagate around the ring network, (e) operating the G-link controller at all nodes such that when said G-link first timing period terminates the method will start over at step (b), (f) operating the B-link controller and the SCI link controller in a first node when said SCI link controller is either not in synchronization with the incoming SCI stream from said receiver or is not operational so that said B-link controller initializes said SCI link controller and transmits a second control word to the next downstream receiver if said SCI link controller was not operational or said SCI link controller was not in synchronization with said incoming SCI stream, (g) operating the B-link controller at each node to determine when said node has received a second control word from the transmitter of the adjacent upstream node to cause said transmitter at said node to transmit said second control word to the next downstream node and to set a second timing period for said B-link controller at said node that prevents any additional second control words that are received at said node from affecting said node for the time it takes for the second control word to propagate around the ring network, (h) operating the B-link controller at all nodes such that when said B-link second timing period terminates the method will start over at step (b), and (i) enabling the transmission of data when said SCI link, G-link transmitter and receiver are all synchronized and operational.

* * * * *